(12) United States Patent
Braunisch et al.

(10) Patent No.: US 7,085,449 B2
(45) Date of Patent: Aug. 1, 2006

(54) WAVEGUIDE COUPLING MECHANISM

(75) Inventors: Henning Braunisch, Chandler, AZ (US); Steven Towle, deceased, late of Phoenix, AZ (US); by Anna George, legal representative, Sunnyvale, CA (US); Daoqiang Lu, Chandler, AZ (US); Gilroy Vandentop, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 10/934,858

(22) Filed: Sep. 3, 2004

(65) Prior Publication Data
US 2006/0051021 A1   Mar. 9, 2006

(51) Int. Cl.
G02B 6/12   (2006.01)
G02B 6/32   (2006.01)
G02B 6/124  (2006.01)

(52) U.S. Cl. ............................. 385/33; 385/14; 385/15

(58) Field of Classification Search ................ None
See application file for complete search history.

(56) References Cited

U.S. PATENT DOCUMENTS

| | | | |
|---|---|---|---|
| 4,753,521 A * | 6/1988 | Deserno .................... 359/663 |
| 4,900,120 A * | 2/1990 | Caviglia et al. ............. 385/50 |
| 5,195,150 A * | 3/1993 | Stegmueller et al. ......... 385/33 |
| 6,571,036 B1 * | 5/2003 | Deng et al. ................ 385/33 |
| 6,952,744 B1 * | 10/2005 | Farnworth et al. ........... 710/13 |
| 2002/0196998 A1 * | 12/2002 | Steinberg et al. ............ 385/14 |
| 2003/0228109 A1 * | 12/2003 | Uekawa ..................... 385/49 |

* cited by examiner

*Primary Examiner*—Michelle Connelly-Cushwa
(74) *Attorney, Agent, or Firm*—Blakely, Sokoloff, Taylor & Zafman LLP

(57) ABSTRACT

A system is disclosed. The system includes an external waveguide and an IC coupled to the external waveguide. The IC includes at least two lenses and a second waveguide. The lenses couple radiant energy from the external waveguide to the second waveguide.

22 Claims, 4 Drawing Sheets

WAVEGUIDE COUPLING MECHANISM

FIELD OF THE INVENTION

The present invention relates to optical waveguides; more particularly, the present invention relates to coupling radiant energy from an external waveguide into a waveguide on an integrated circuit.

BACKGROUND

More frequently, optical input/output (I/O) is being used in computer systems to transmit data between system components. Optical I/O is able to attain higher system bandwidth with lower electromagnetic interference than conventional I/O methods. In order to implement optical I/O, radiant energy is coupled from an external waveguide to a waveguide on an integrated circuit (IC). However, a problem occurs in aligning the external and IC waveguides while at the same time achieving good coupling efficiency. In addition, current mechanisms used to couple waveguides suffer from significant costs for high-volume manufacturing due to the limitations of active alignment.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

According to one embodiment a waveguide coupling mechanism is disclosed. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
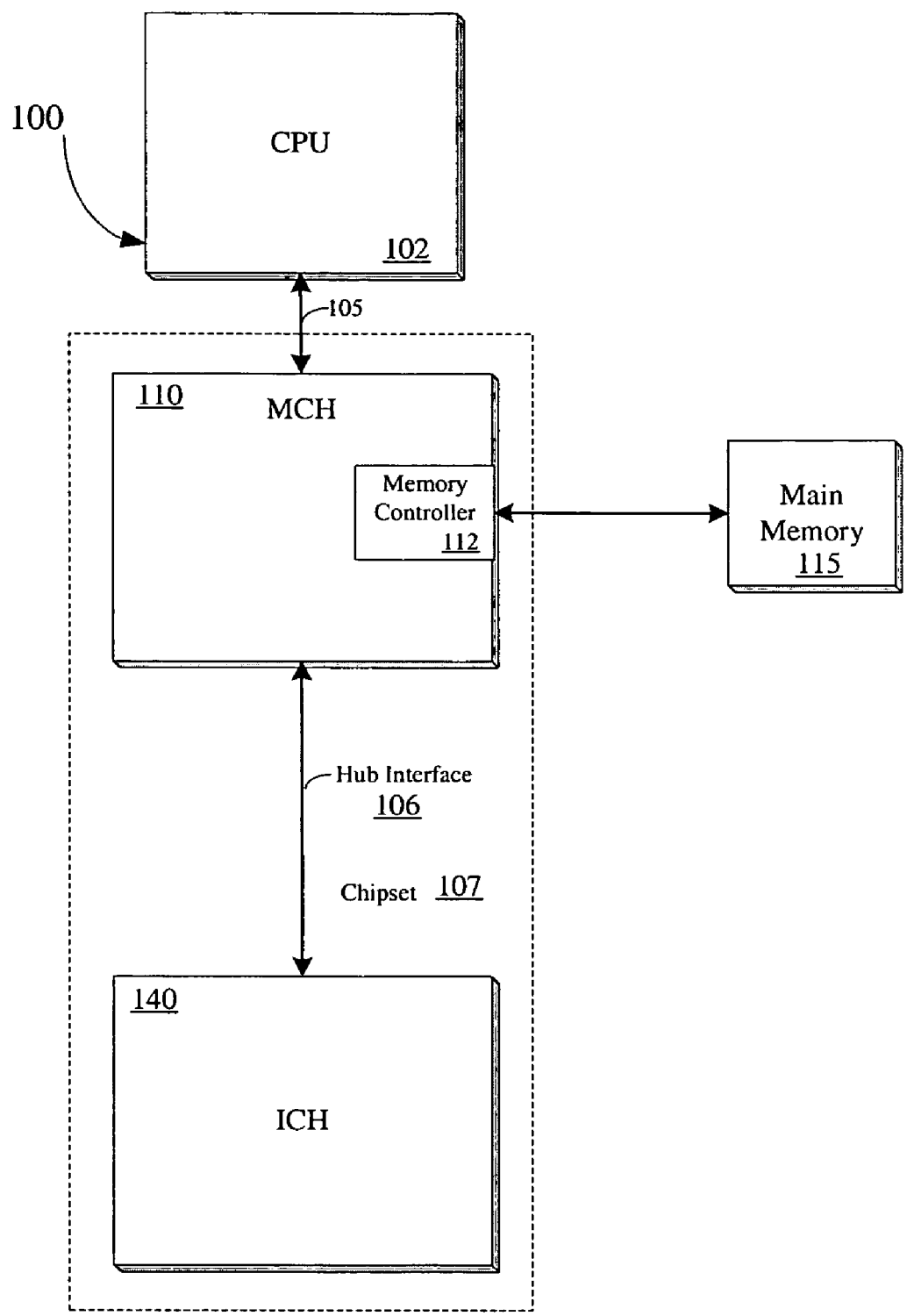
FIG. 1 illustrates one embodiment of a computer system.

FIG. 1 is a block diagram of one embodiment of a computer system 100. Computer system 100 includes a central processing unit (CPU) 102 coupled to a bus 105. In one embodiment, CPU 102 is a processor in the Pentium® family of processors including the Pentium® II processor family, Pentium® III processors, and Pentium® IV processors available from Intel Corporation of Santa Clara, Calif. Alternatively, other CPUs may be used.

According to one embodiment, bus 105 is a front side bus (FSB) that communicates with a memory control hub (MCH) 110 component of a chipset 107. MCH 110 includes a memory controller 112 that is coupled to a main system memory 115. Main system memory 115 stores data and sequences of instructions and code represented by data signals that may be executed by CPU 102 or any other device included in system 100. In one embodiment, main system memory 115 includes dynamic random access memory (DRAM); however, main system memory 115 may be implemented using other memory types.

According to one embodiment, MCH 110 is coupled to an input/output control hub (ICH) 140 via a hub interface 106. ICH 140 provides an interface to input/output (I/O) devices within computer system 100.

Figure 2:
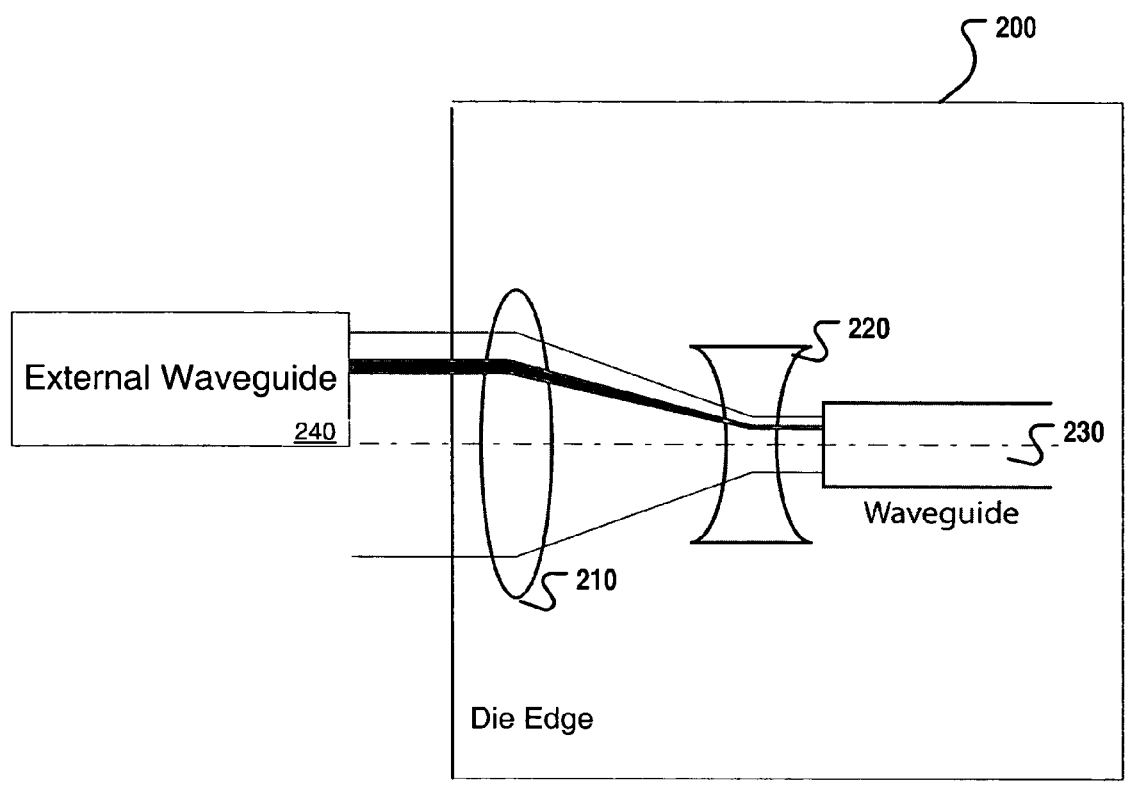
FIG. 2 illustrates one embodiment of an IC coupled to an optical waveguide.

FIG. 2 illustrates one embodiment of an integrated circuit (IC) 200 coupled to an external waveguide 240. In one embodiment, IC 200 may be implemented as part of CPU 102, while external waveguide 240 is part of bus 105. In another embodiment, IC 200 may be a component of MCH 110 and external waveguide 240 may be a constituent of hub interface 106. Alternatively, IC 200 and external waveguide 240 may be part of any type of system where an IC is coupled to an optical bus.

IC 200 includes lenses 210 and 220, and waveguide 230. According to one embodiment, lenses 210 and 220 are used to couple waveguide 230 and external waveguide 240 with high coupling efficiency and high misalignment tolerance. Particularly, lenses 210 and 220 condense a beam of radiant energy from a larger diameter (near external waveguide 240) to a smaller diameter (near waveguide 230). Consequently, lenses 210 and 220 transmit the beam of radiant energy to waveguide 230 with a high horizontal misalignment tolerance. Lenses 210 and 220 also enable the coupling structure to be more compact, for example, shorter along the optical axis of the coupler.

In one embodiment lenses 210 and 220 are bi-convex and bi-concave lenses, respectively. In a further embodiment lenses 210 and 220 are cylindrical lenses. Cylindrical lenses may be more manufacturable using standard planar fabrication technology. In one embodiment, the cylinder axes for the lenses are perpendicular to IC 200. Therefore radiant energy is only refracted laterally.

According to one embodiment, conventional planar fabrication technologies are employed to manufacture cylindrical lens structures and waveguide 230. Fabrication technologies may include UV lithography followed by an etching process. Fabrication may also include UV direct writing using a UV-laser beam without the need for a mask. Molding or hot embossing (in the case of polymers) may also be used. Laser ablation is another possible fabrication method. Also, photolithography so that multiple lenses and waveguide 230 can be fabricated in the same step may be used.

Waveguide 230 receives radiant energy and transmits the radiant energy to other components in IC 200. As discussed above, waveguide 230 receives the radiant energy with good coupling efficiency due to the presence of lenses 210 and 220. In another embodiment, waveguide 230 may also transmit radiant energy that is then received by external waveguide 240. In other embodiments, waveguide 230 may be replaced by a different optical element such as a photodetector or a laser.

Figure 3:
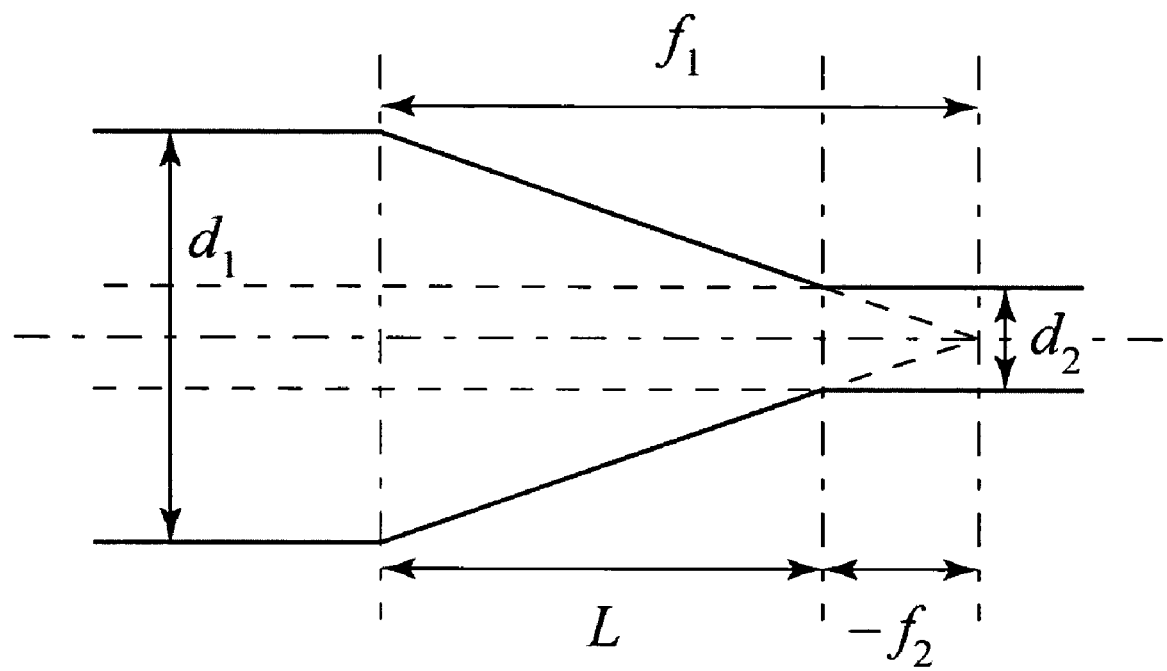
FIG. 3 illustrates one embodiment of a ray diagram for an optical waveguide.

FIG. 3 illustrates one embodiment of a ray diagram corresponding to IC 200 and external waveguide 240 coupling shown in FIG. 2. The ray diagram includes quantity L, which represents the distance between lenses 210 and 220. In one embodiment L is 75 μm, however, other distances can be used. Smaller values of L are implemented as long as a high coupling efficiency can be maintained. Horizontal passive alignment between external waveguide 240 and waveguide 230 may be achieved by increasing or decreasing the value of L.

The ray diagram also includes $d_1$ and $d_2$ which represent the beam diameters of lenses 210 and 220, respectively. The ray diagram further includes $f_1$ and $f_2$, which represent the focal lengths of lenses 210 and 220, respectively. The following equation can be used to determine the value of $f_1$:

$$f_1 = \frac{d_1 L}{d_1 - d_2}$$

and $f_2$ is determined by the following equation:

$$f_2 = L - f_1$$

In one embodiment, $d_1$=50 μm, $d_2$=5 μm and L=75 μm leads to $f_1$=83.3 μm and $f_2$=−8.3 μm.

Since focal lengths have been determined, the Gaussian lens formula provides the radii ($R_1$ and $R_2$) of curvature for lenses 210 and 220 to be fabricated from material with a refractive index n (with respect to the surrounding medium, for example, n=$n_{lens}/n_{surround}$) as $$R_1 = 2(n-1)f_1$$

and $$R_2 = 2(n-1)(-f_2) = R_1 \frac{d_2}{d_1}$$

According to one embodiment, lenses 210 and 220 are made from polymer (having a refractive index of 1.5) and surrounded by air (with a refractive index of 1.0). With n equaling 1.5 then $R_1$=83.3 μm and $R_2$=−8.3 μm. In another embodiment, other combinations of materials may be used for lenses 210 and 220 so long as the material has a higher refractive index than the surrounding material. Other possible materials are detailed in Table 1. Furthermore, Table 2 lists other values for various lens characteristics.

TABLE 1

| Material | Air | Silicon oxide | Polymer | Oxynitride | Silicon |
|---|---|---|---|---|---|
| n | 1 | 1.5 | 1.5 ... 1.6 | 1.5 ... 2 | 3.5 |

TABLE 2

| $n_{lens}$ | 1.5 | 1.6 | 1.7 | 1.8 | 1.9 | 2 | 3.5 | 3.5 |
|---|---|---|---|---|---|---|---|---|
| $n_{surround}$ | 1 | 1 | 1 | 1 | 1 | 1 | 1 | 1.5 |
| $R_1$ [μm] | 83.33 | 100.00 | 116.67 | 133.33 | 150.00 | 166.67 | 416.67 | 222.22 |
| $R_2$ [μm] | 8.33 | 10.00 | 11.67 | 13.33 | 15.00 | 16.67 | 41.67 | 22.22 |

Figure 4:
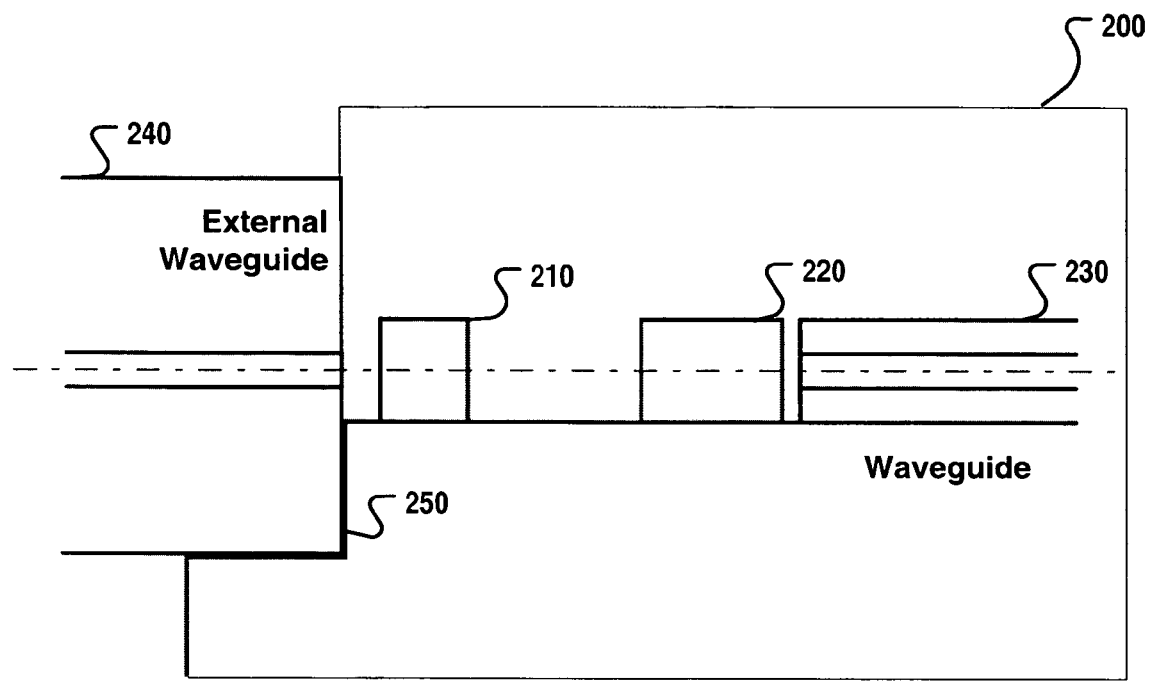
FIG. 4 illustrates a side view of another embodiment of an IC coupled to an optical waveguide.

FIG. 4 illustrates a side view of one embodiment of IC 200 coupled to external waveguide 240. In such an embodiment IC 200 includes ledge 250 which is, for example, etched out of IC 200. Ledge 250 is included to achieve passive vertical alignment, which occurs when external waveguide 240 is coupled to ledge 250. Thus, ledge 250 functions as a mechanical stop that enables external waveguide 240 to be properly aligned with lens 210. In other embodiments, passive vertical alignment may be achieved in other ways.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A system, comprising:
   an external waveguide; and
   an integrated circuit (IC), coupled to the external waveguide, comprising:
   a bi-convex lens;
   a bi-concave lens, and
   a second waveguide, wherein the lenses couple radiant energy from the external waveguide to the second waveguide, and
   wherein the bi-convex lens, the bi-concave lens, and the second wavepuide are integrally formed.

2. The system of claim 1 wherein the IC further comprises a ledge to align the external waveguide.

3. The system of claim 2 wherein the ledge mechanically stops the external waveguide in order to achieve vertical passive alignment.

4. The system of claim 2 wherein the ledge is etched out of the IC.

5. The system of claim 1 wherein the distance between the lenses are varied to facilitate horizontal passive alignment between the external waveguide and the second waveguide.

6. The system of claim 1 wherein the material of the lenses is selected from a group comprising silicon oxide, polymer, oxynitride, and silicon.

7. The system of claim 6 wherein material surrounding the lenses is selected from a group comprising air, silicon oxide, polymer, oxynitride, and silicon.

8. The system of claim 1 wherein the bi-concave lens is located at the second waveguide and the bi-convex lens is located at the edge of the IC.

9. The system of claim 1 wherein the lenses are cylindrical.

10. The system of claim 1 wherein the second waveguide is a photodetector.

11. The system of claim 1 wherein the second waveguide is a laser.

12. The system of claim 1 wherein the second waveguide is an optical bus.

13. A computer system, comprising:
   a central processing unit (CPU) comprising:
      a bi-convex lens,
      a bi-concave lens, and
      a waveguide,
      wherein the bi-convex lens, the bi-concave lens, and the waveguide are integrally formed;
   a bus coupled to the CPU, wherein the lenses couple radiant energy from the bus to the waveguide; and
   a main memory coupled to the bus.

14. The computer system of claim 13 wherein the CPU further comprises a ledge to align the bus.

15. The computer system of claim 14 wherein the ledge mechanically stops the bus in order to achieve vertical passive alignment.

16. The computer system of claim 13 wherein the lenses achieve horizontal passive alignment between the external waveguide and the second waveguide by varying the distance between the lenses.

17. The computer system of claim 13 wherein the bus is an optical bus.

18. The computer system of claim 13 wherein the lenses are cylindrical lenses.

19. A method, comprising:
   receiving radiant energy at an integrated circuit (IC) from an external waveguide; and
   coupling the radiant energy to a second waveguide on the IC using a bi-convex lens and a bi-concave lens;
   wherein the bi-convex lens, the bi-concave lens and the second waveguide are integrally formed.

20. The method of claim 19 further comprising aligning the lenses with the external waveguide using a ledge on the IC.

21. The method of claim 20 further comprising aligning the external waveguide with the second waveguide vertically passively by using the ledge as a mechanical stop.

22. The method of claim 19 further comprising varying the distance between the lenses to facilitate horizontal passive alignment between the external waveguide and the second waveguide.

* * * * *